United States Patent
Conrad et al.

(10) Patent No.: US 10,327,392 B2
(45) Date of Patent: Jun. 25, 2019

(54) BATTERY-POWERED DEBRIS BLOWER

(71) Applicant: Mean Green Products, LLC, Hamilton, OH (US)

(72) Inventors: Joseph C. Conrad, Okeana, OH (US); Matthew C. Conrad, Okeana, OH (US)

(73) Assignee: Mean Green Products, LLC, Hamilton, OH (US)

( * ) Notice: Subject to any disclaimer, the term of this patent is extended or adjusted under 35 U.S.C. 154(b) by 601 days.

(21) Appl. No.: 14/933,527

(22) Filed: Nov. 5, 2015

(65) Prior Publication Data

US 2016/0120131 A1    May 5, 2016

Related U.S. Application Data

(63) Continuation-in-part of application No. 14/883,921, filed on Oct. 15, 2015.

(60) Provisional application No. 62/075,394, filed on Nov. 5, 2014.

(51) Int. Cl.
| | |
|---|---|
| A47L 9/22 | (2006.01) |
| A01G 20/43 | (2018.01) |
| A47L 5/14 | (2006.01) |
| F04D 25/06 | (2006.01) |
| F04D 17/16 | (2006.01) |
| F04D 29/42 | (2006.01) |
| F04D 29/70 | (2006.01) |

(52) U.S. Cl.
CPC ............ *A01G 20/43* (2018.02); *A47L 5/14* (2013.01); *A47L 9/22* (2013.01); *F04D 17/16* (2013.01); *F04D 25/0673* (2013.01); *F04D 29/4226* (2013.01); *F04D 29/703* (2013.01)

(58) Field of Classification Search
CPC ... A47L 9/22; A47L 5/14; F04D 25/06; F04D 17/16
USPC ..................................... 15/405, 413
See application file for complete search history.

(56) References Cited

U.S. PATENT DOCUMENTS

| | | | |
|---|---|---|---|
| 4,622,714 A | 11/1986 | Tomasello | |
| 5,011,058 A * | 4/1991 | Sapp ........................ | A47L 5/36 15/327.5 |

(Continued)

OTHER PUBLICATIONS

RedMax, EBZ7500 Operator's Manual, Oct. 2010.
RedMax, EBZ8500 Operator's Manual, Jan. 2011.

*Primary Examiner* — Michael D Jennings
(74) *Attorney, Agent, or Firm* — Madeline Schlederer; Godfrey & Kahn, S.C.

(57) ABSTRACT

A debris blower, having a fan frame, with a back plate and a motor plate, the back plate and motor plate being connected to and separated by a side wall. A fan assembly is positioned within the fan frame, and is rotated by a motor. A controller is electrically connected to the motor and to a battery pack, to energize the motor. A vehicle mounting plate is connected to a vehicle, and a blower mounting plate is connected to the fan frame, so as to removably connect the blower to the vehicle. A mounting tube is connected to the vehicle mounting plate. The blower mounting plate includes at least one hook for connecting with the mounting tube. The blower mounting plate may further include flange extensions to contact the vehicle mounting plate. The direction of the outlet of the blower can be remotely controlled by the operator.

20 Claims, 9 Drawing Sheets

(56) References Cited

U.S. PATENT DOCUMENTS

| | | | |
|---|---|---|---|
| 5,195,208 A * | 3/1993 | Yamami | A47L 5/36 |
| | | | 15/326 |
| 5,547,341 A | 8/1996 | Amin | |
| 5,813,088 A | 9/1998 | Wagner et al. | |
| 6,006,400 A | 12/1999 | Presenza | |
| 6,305,048 B1 | 10/2001 | Salisian | |
| 6,370,729 B2 | 4/2002 | Miyamoto | |
| 6,526,624 B2 | 3/2003 | Miyamoto | |
| 6,592,329 B1 | 7/2003 | Hirose | |
| 6,640,384 B2 | 11/2003 | Sanders | |
| 6,843,639 B2 | 1/2005 | Schutt | |
| 7,055,213 B2 | 6/2006 | Iida | |
| 7,096,597 B1 | 8/2006 | Zellous | |
| D533,266 S | 12/2006 | Yoshida et al. | |
| 7,621,019 B2 * | 11/2009 | Kremsler | A47L 5/14 |
| | | | 15/405 |
| 7,721,384 B2 | 5/2010 | Crevling, Jr. | |
| 8,579,058 B1 | 11/2013 | Yamada et al. | |
| 8,740,027 B2 | 6/2014 | Manor | |
| 9,486,120 B2 | 11/2016 | Day | |
| 2005/0061265 A1 | 3/2005 | Yuasa | |
| 2007/0220702 A1 * | 9/2007 | Lauer | A47L 5/14 |
| | | | 15/405 |
| 2007/0294855 A1 | 12/2007 | Iida | |
| 2008/0101966 A1 | 5/2008 | Lopatinsky | |
| 2009/0246013 A1 | 10/2009 | Kenyon | |
| 2011/0197389 A1 * | 8/2011 | Ota | B25F 5/00 |
| | | | 15/339 |
| 2012/0051904 A1 | 3/2012 | Hagen | |
| 2012/0234412 A1 | 9/2012 | Prager | |
| 2013/0004307 A1 | 1/2013 | Fukuda | |
| 2013/0280108 A1 | 10/2013 | Bearup | |
| 2015/0020345 A1 * | 1/2015 | Day | A47L 5/24 |
| | | | 15/347 |
| 2015/0182082 A1 | 7/2015 | Garcia-Otero | |
| 2015/0237808 A1 | 8/2015 | Prager | |
| 2015/0377253 A1 | 12/2015 | Shibata | |
| 2016/0108924 A1 | 4/2016 | Conrad | |
| 2016/0298635 A1 | 10/2016 | Su | |

* cited by examiner

BATTERY-POWERED DEBRIS BLOWER

CROSS REFERENCE TO RELATED APPLICATION

This application is based on and claims priority from U.S. Provisional Patent Application No. 62/075,394 filed on Nov. 5, 2014, and is a continuation-in-part of U.S. patent application Ser. No. 14/883,921, filed Oct. 15, 2015, each of which is incorporated herein by reference in its entirety for all purposes.

BACKGROUND OF THE INVENTION

The present invention relates generally to the field of lawn, leaf and turf blowers, and specifically to debris blowers mountable to a vehicle.

In general, debris blowers are known in the commercial turf care industry. Most such debris blowers are hand-held or backpack-style, and most are gasoline-powered, that is, they have a gasoline engine that powers the blower. In such gas-powered blowers, the gasoline engine needs to be very small and light, in order for it to be possible that the unit can be carried by the user, such as in the user's hand or on the back of the user. Accordingly, most such gas-powered blowers have air-cooled 2-cycle engines. Such blowers are often very noisy. A typical gas debris blower will spin a small fan at about 9,000-10,000 rpm. Such a blower will generally deliver about 500 cfm at 150 mph out of the tube, and will cause about a 75-84 db noise level at 50 feet of distance. Further, 2-cycle engines run hot and emit a large amount of air pollution, have high operating costs because of the gasoline/oil mixture, and can be difficult to start with a pull string and manual choke lever. Particularly in a commercial setting, where use of such blowers can be all day long, operators can feel sick from the odors and fumes of gas engines, and feel fatigue from the work of starting and carrying the noisy gas-powered blowers. Most operators will do anything they can to avoid using the gas-powered blowers.

One attempt at a solution to the heat and noise, air pollution, hard starting, and high operating cost problems associated with 2-cycle gas engine powered blowers, has been to try electric powered blowers. Some weight can be eliminated if a corded version is used, but the fact that the blower is corded so severely limits the physical range of use that it is impractical for commercial applications. And conventional handheld cordless versions are much smaller, and generally have a small battery that will only run 9-12 minutes at top speed, requiring constant recharging with the delays and inefficiencies associated with the charging. At the same time, even electric powered blowers have not solved the problem of noise, as the fans they have used to move the air have been at least as much a source of the noise as has been the gas powered engines. Most hand-held battery-operated cordless blowers spin a very small ducted fan at about 18,000-22,000 rpm. Most hand-held battery-operated cordless blowers move air at about 400 cfm at a maximum speed of about 130 mph, and most such cordless blowers cause about 65-70 db of noise at 50 feet of distance.

The present invention relates to improvements over the apparatus described above and to solutions to some of the problems raised or not solved thereby.

SUMMARY OF THE INVENTION

The invention provides a debris blower removably mountable to a vehicle, such as a riding lawn mower. According to the invention, the debris blower has a fan frame, with a back plate and a motor plate, the motor plate having an opening of a certain area which functions as an air inlet, the back plate and motor plate being connected to and separated by a side wall, and both being generally ring shaped, except having an air outlet area. A fan assembly is positioned within the fan frame, the fan assembly having a back ring and a front ring, those two rings being spaced apart from each other by a plurality of vanes, each vane angled and curved the same as all the other vanes with respect to the center of the back ring. A motor includes a stator and a motor shaft rotatable with respect to the stator. The stator is connected to the fan frame, and the shaft is connected to the fan assembly, so as to rotate the fan assembly within the fan frame, and thus move air from the air inlet to the air outlet. A removable battery pack has electrical connectors, and mating electrical connectors are mounted to the fan frame and capable of mating to the electrical connectors of the removable battery pack. A controller is electrically connected to the motor and to the battery pack, for using power from the battery pack to energize the motor and thus rotate the fan to move air from the air inlet to the air outlet. A vehicle mounting plate is connected to a vehicle, and a blower mounting plate is connected to the fan frame, and is capable of engaging with the vehicle mounting plate so as to removably connect the blower to the vehicle. A mounting tube is connected to the vehicle mounting plate. The blower mounting plate includes at least one hook for connecting with the mounting tube. The vehicle mounting plate further includes flanges, and the blower mounting plate includes flange extensions to contact the vehicle mounting plate. A handle and a stand are connected to the fan frame. An outlet tube is removably and rotatably attached to the air outlet. A directional controller is provided for controlling the direction of the outlet tube, the directional controller including an actuator connected between the fan frame and the outlet tube. A tube control lever is connected to the outlet tube. The actuator includes a movable part connected to the control lever, and a stationary part connected to the fan frame.

Other objects and advantages of the invention will become apparent hereinafter.

DETAILED DESCRIPTION

Referring now to the drawing figures, the invention provides a battery-powered debris blower 10, mountable to a vehicle. In the embodiment shown, the blower 10 includes a fan frame 12. Fan frame 12 includes a substantially flat back plate 14, which is generally circular except for an outlet area 14a which will be explained below. Fan frame 12 also includes a substantially flat motor plate 16 which is also generally circular except for its own outlet area 16a that substantially matches the outlet area 14a of back plate 14. Motor plate 16 is positioned forward of and substantially parallel to back plate 14, with the outlet areas 14a and 16a aligned over each other. The back plate 14 and the motor plate 16 are maintained at a predetermined separation from each other by a side wall 18 mounted substantially perpendicular to, and at the periphery of, the back plate and motor plate. The centers of the back plate 14 and motor plate 16 form a line substantially parallel to the side wall 18.

Figure 3:
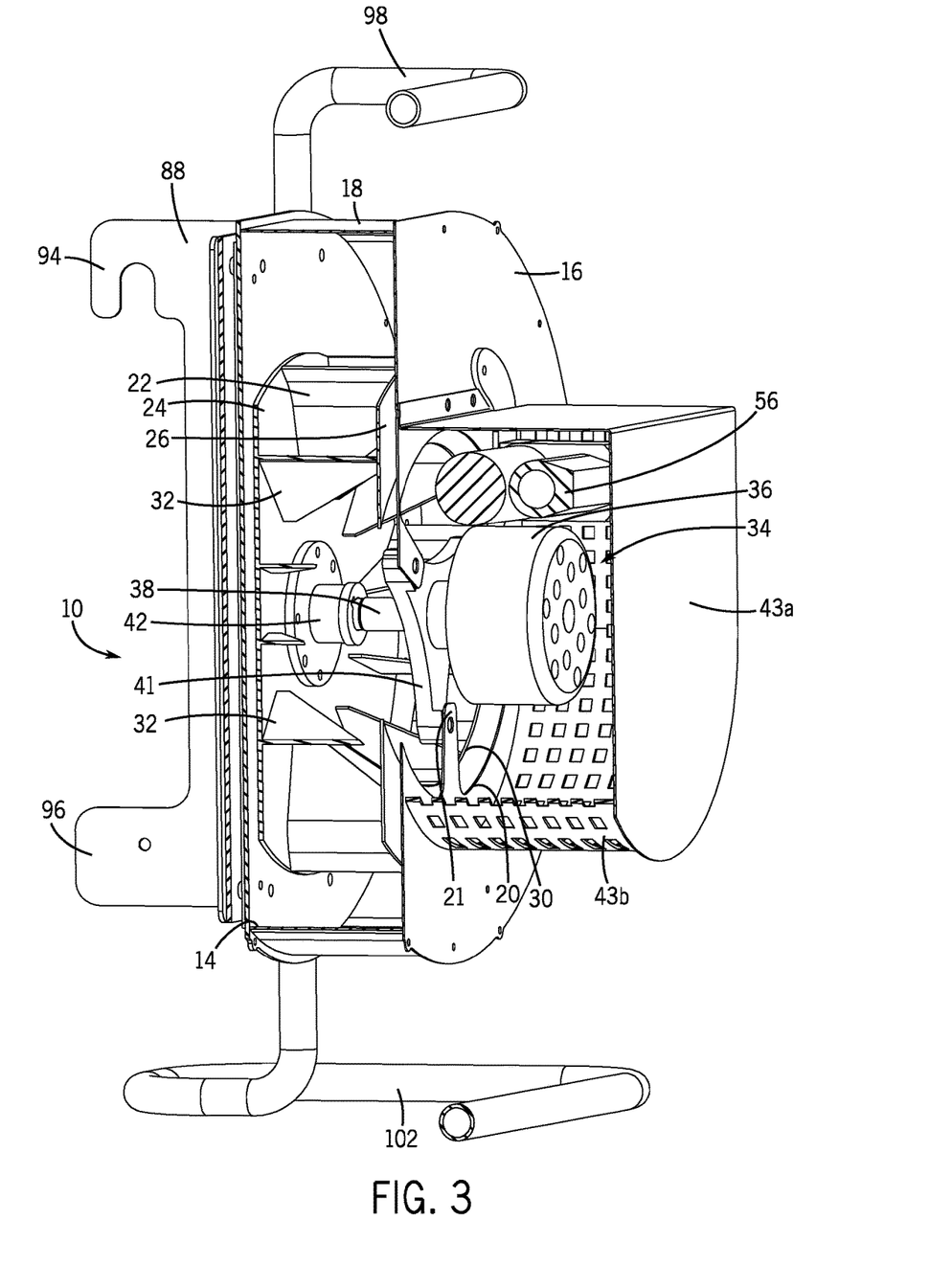
FIG. 3 is a front/side angle view, partially in section, of the battery-powered debris blower shown in FIGS. 1 and 2.

As can be seen in FIG. 3, the motor plate 16 has an opening 20 at its center, which acts as an air inlet. The opening 20 is generally round, and the diameter is about half of the diameter of the motor plate itself, except that there are motor mounting arms 21 extending generally radially inward from the inner edges of the opening.

The embodiment shown in FIG. 3 includes a centrifugal fan assembly 22 with forward curved vanes 32. The fan assembly 22 is positioned within the fan frame 12, that is, between the back plate 14 and the motor plate 16, and within the side wall 18. The fan assembly 22 includes a back ring 24, and a front ring 26. The rings 24, 26 have similar outer diameters. Front ring 26 has a front ring opening 30 at its center, the diameter of which opening is about 70% of the outside diameter of the front ring. The plane of the front ring 26 is spaced apart from and parallel to the plane of the back ring 24, held at a predetermined spacing by a number of the vanes 32, spaced generally equally about the circumference of the rings.

The embodiment shown in FIG. 3 has 12 vanes, but other numbers of vanes could also work well. Each of the vanes 32 is connected to both rings 24, 26. From the inner edge of front ring 26, each vane 32 tapers down to a point of connection to the back ring 24 at a point about 75% of the distance from the outer circumference to the center. The outer approximately 30% of each vane 32 is curved or angled in the direction of the rotation of the fan assembly, that is, forward, at an angle of about 35 degrees.

Figure 4:
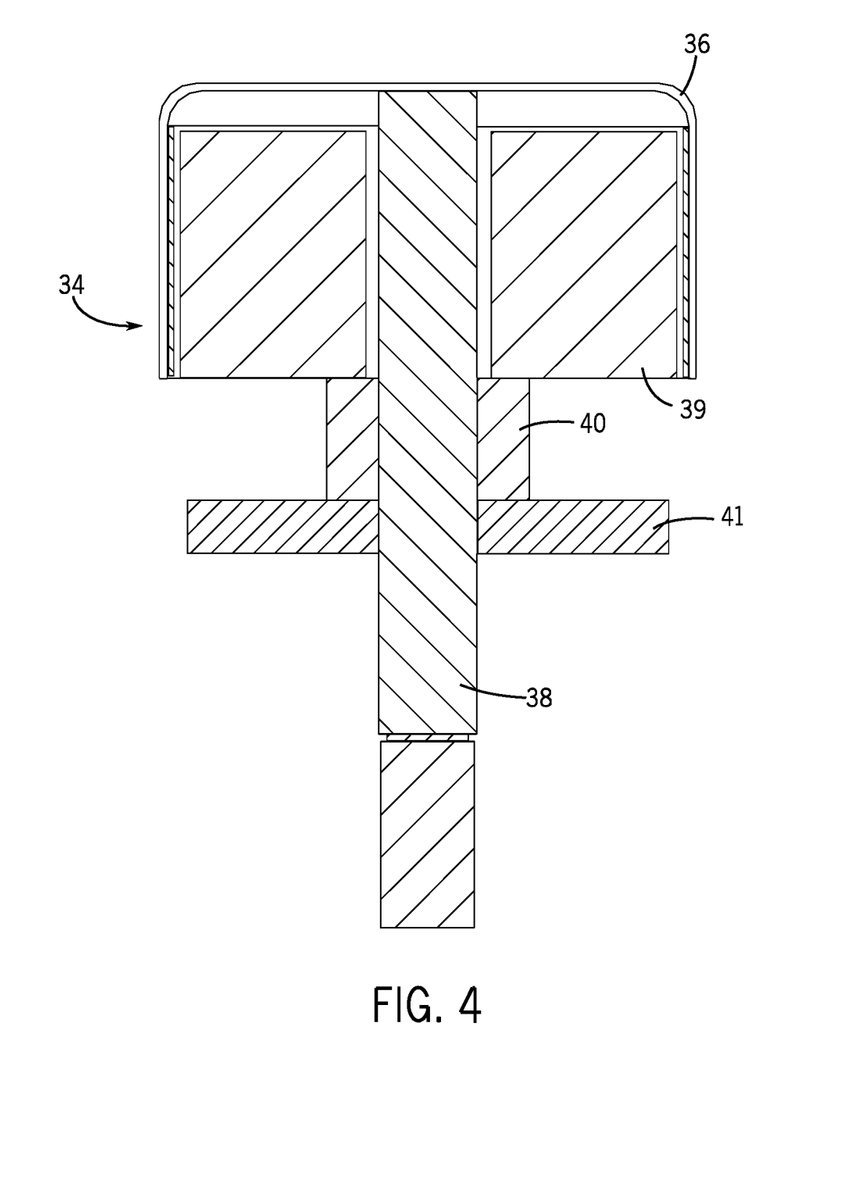
FIG. 4 is a sectional view through a motor provided in one embodiment of the invention.

As can be seen by comparing FIGS. 3 and 4, the invention provides a motor 34 to rotate the fan assembly 22. In the embodiment there shown, the motor 34 is an outrunner-type motor, which is advantageous because such a motor runs at a lower speed, eliminating the weight and complexity of a gearbox or reducer, while at the same time producing more torque than an inrunner-style motor. Motor 34 has a motor body 36 that is connected to and rotates with a motor shaft 38, and a motor stator 39 mostly inside the motor body. Motor stator 39 is rigidly affixed to a motor mounting bracket 40 which, as shown best in FIG. 3, has motor bracket arms 41 extending generally radially outward, the ends of which are bolted or otherwise removably attached to the motor mounting arms 21. Since motor mounting arms 21 are part of the motor plate 16, the stator 39 of motor 34 is thus non-rotatably connected to the motor plate 16. The motor shaft 38 is rigidly connected to the back ring 24 of the fan assembly 22 by means of a fan hub 42. Thus when the motor shaft 38 is rotated with respect to the motor mounting bracket 40, the fan assembly 22 is rotated with respect to the motor plate 16, and with respect to the fan frame 12 in general.

In the embodiment shown, the motor 34 is enclosed for safety by a motor cover 43a, and a motor guard 43b. In this embodiment motor guard 43b is formed of a mesh material to permit the passage of air, but either or both of the motor cover 43a and motor guard 43b may have air openings to permit air to pass to air inlet or opening 20.

Figure 1:
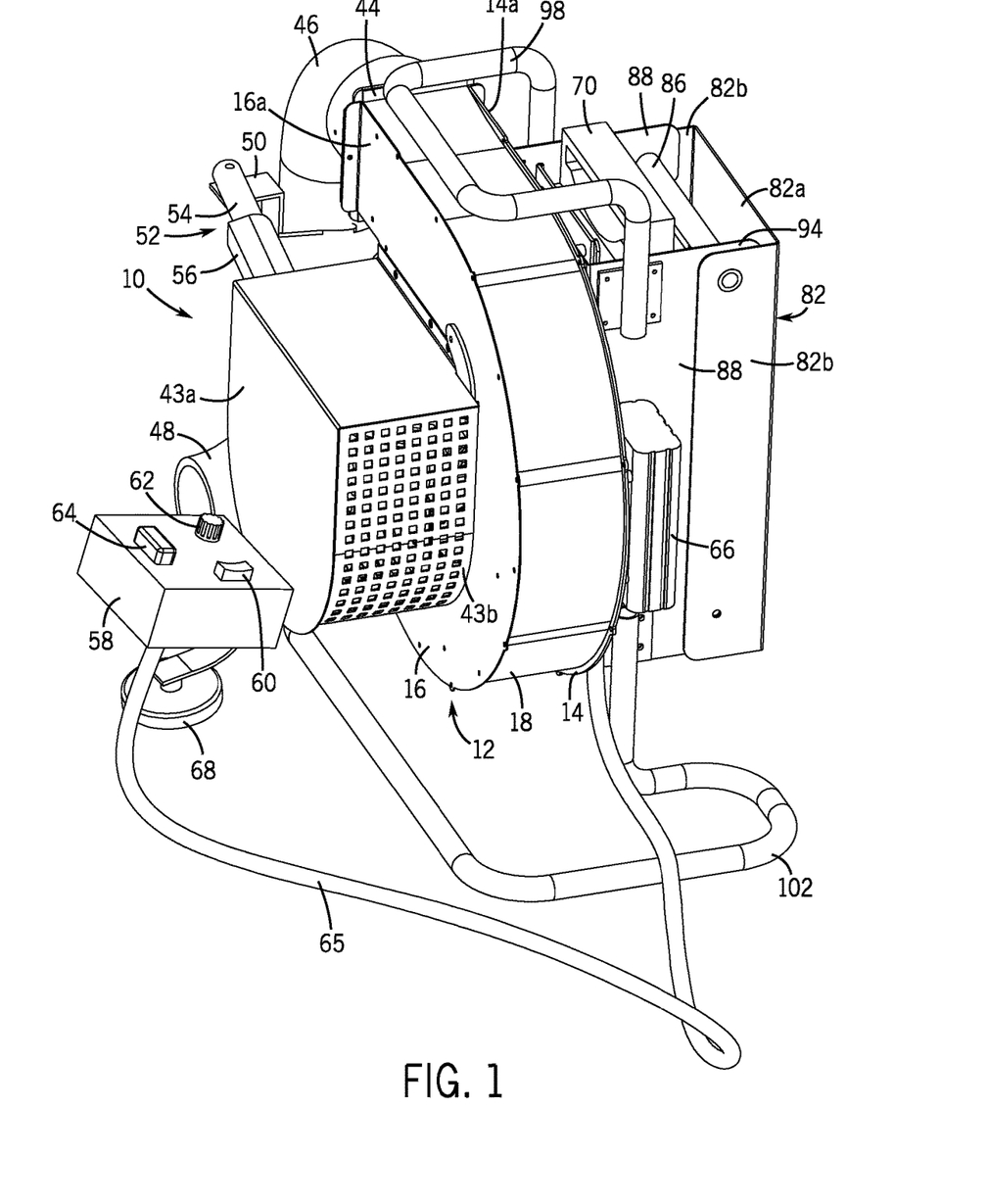
FIG. 1 is an isometric view of a battery-powered debris blower constructed according to one embodiment of the invention.
Figure 2:
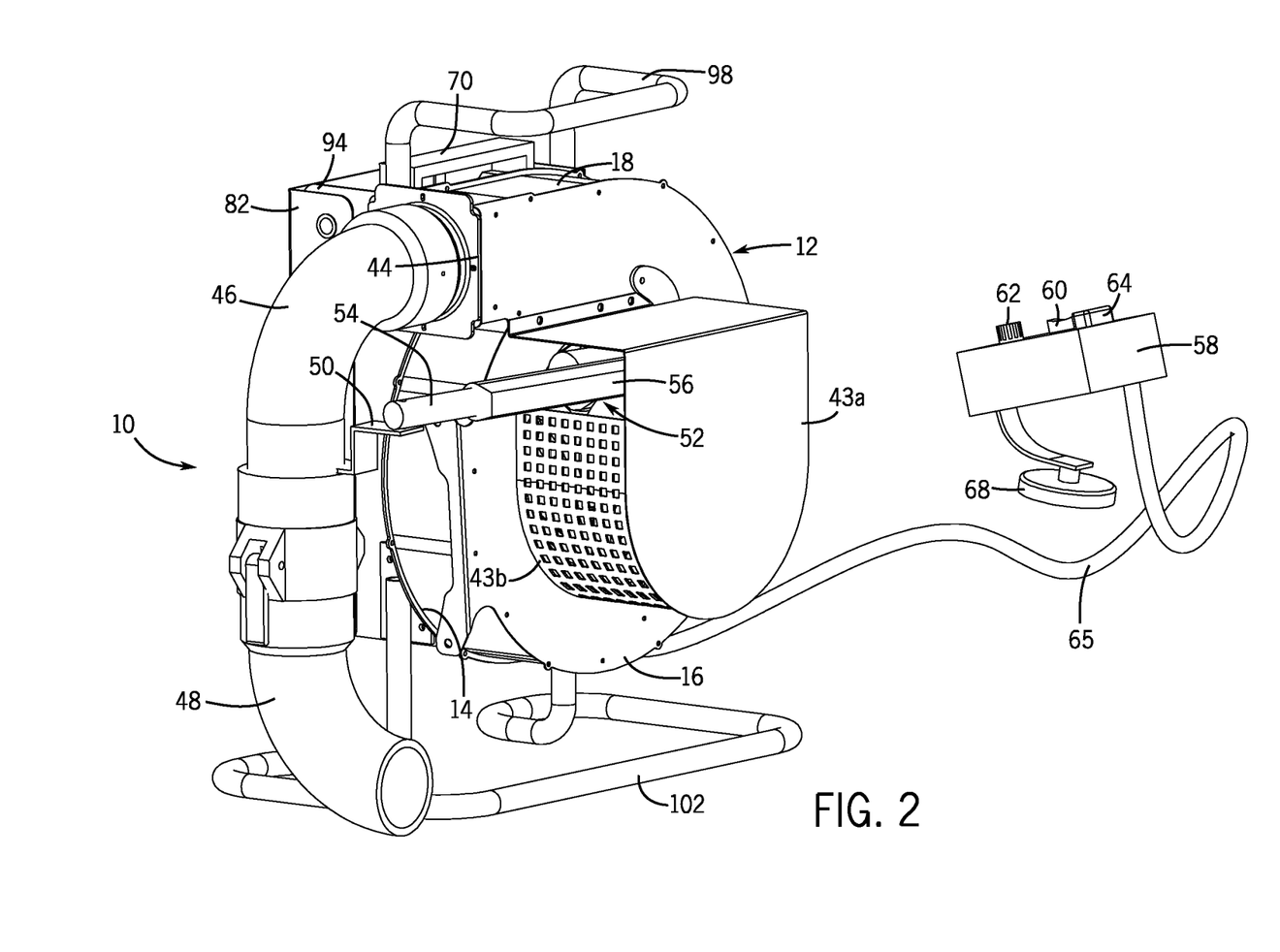
FIG. 2 is an isometric view of the battery-powered debris blower shown in FIG. 1, from the opposite side.

The side wall 18 does not entirely enclose the fan assembly 22, instead having an outlet 44 which allows escape of the air being moved by the fan assembly, and in fact, use of the blower 10 as a blower. The area of the outlet opening is about 25% of the area of the motor plate opening 20, so as to provide proper air flow and pressure. As shown in FIGS. 1 and 2, to the outlet 44 is removably attached one end of a blower tube 46. The other end of the blower tube 46 has an outlet tube 48 attached to it. Other suitable tube connections may be used to direct the air flowing out of the outlet 44, as may be determined to be useful.

At least one embodiment of the invention includes a directional controller for controlling the direction of the outlet tube 48. As shown best in FIGS. 1, 2 and 5, connection between outlet tube 48 and blower tube 46 is a rotatable connection. Alternatively, the outlet tube 48 could be directly and rotatably connected to the outlet 44. In either event, the outlet tube 48 has an outlet tube control lever 50 affixed to it, which rotates with the outlet tube. An actuator 52 provides the operator with the ability to control the direction that the outlet tube 48 faces or points. Actuator 52 includes parts that are movable with respect to each other. In the embodiment shown, a moving part 54, such as a shaft, is connected to the control lever 50, and a stationary part 56, such as a cylinder, is affixed to the fan frame 12. As will be described in further detail below, actuator 52 thus gives the operator the ability to move the moving part 54 with respect to the stationary part 56, between a retracted position and an extended position, and also including various positions therebetween. This motion of the moving part with respect to the stationary part has the effect of rotating the direction of the outlet tube 48 between extreme left- and right-facing positions, enabling the operator to control the direction of the air exiting the outlet tube. In the embodiment shown, actuator 52 is a linear actuator, but other types of actuators might also be useful.

At least one embodiment of the invention includes a control 58 to enable the operator to control the blower 10. As shown best in FIG. 1, in this embodiment the control 58 includes an on-off switch 60, shown as a rocker switch, for controlling whether or not the motor 34 is energized. Control 58 also includes a fan speed control 62, shown as a dial or rotatable knob, for controlling the speed at which the motor 34 is rotated. Control 58 further includes a directional control 64, shown as a slide switch that is can be slid left or right of center, and may or may not return to center on its own, for controlling the actuator 52 as described above, and thus controlling the direction that outlet tube 48 directs the air exiting therefrom. The control 58 is connected by means of a cable 65 to an electronic controller 66, which is in turn electrically connected to the motor 34 and the actuator 52. As will be explained below in a bit more detail, control 58 may be mounted to a vehicle by any suitable means. The control 58 shown in the figures has affixed to it a magnetic mounting pad 68, which will more or less temporarily mount the control to any compatible metal surface.

The power source for the blower 10 is a battery pack 70 which is easily removable and replaceable. As shown best in FIGS. 5 and 6, in one embodiment the battery pack 70 includes a pair of facing ledges 72, one on each side of the battery pack, extending for the length of the battery pack. The ledges 72 engage with a battery mounting plate 74 attached to the back plate 14, and having matching shelves 76, one on side of the battery mounting plate, which interlock with the ledges. As shown best in FIG. 6, also mounted to battery mounting plate 74 is a battery connector 78, which electrically connects the battery pack 70 to controller 66. Thus battery pack 70 is easily slid into and out of contact with battery connector 78, and hence easily removable and replaceable when a freshly charged battery pack is needed. Battery connector 78 could also be used to connect the blower 10 to the electrical system of the vehicle 80, assuming the vehicle's electrical system is capable of supplying the power needed to operate the blower.

Figure 5:
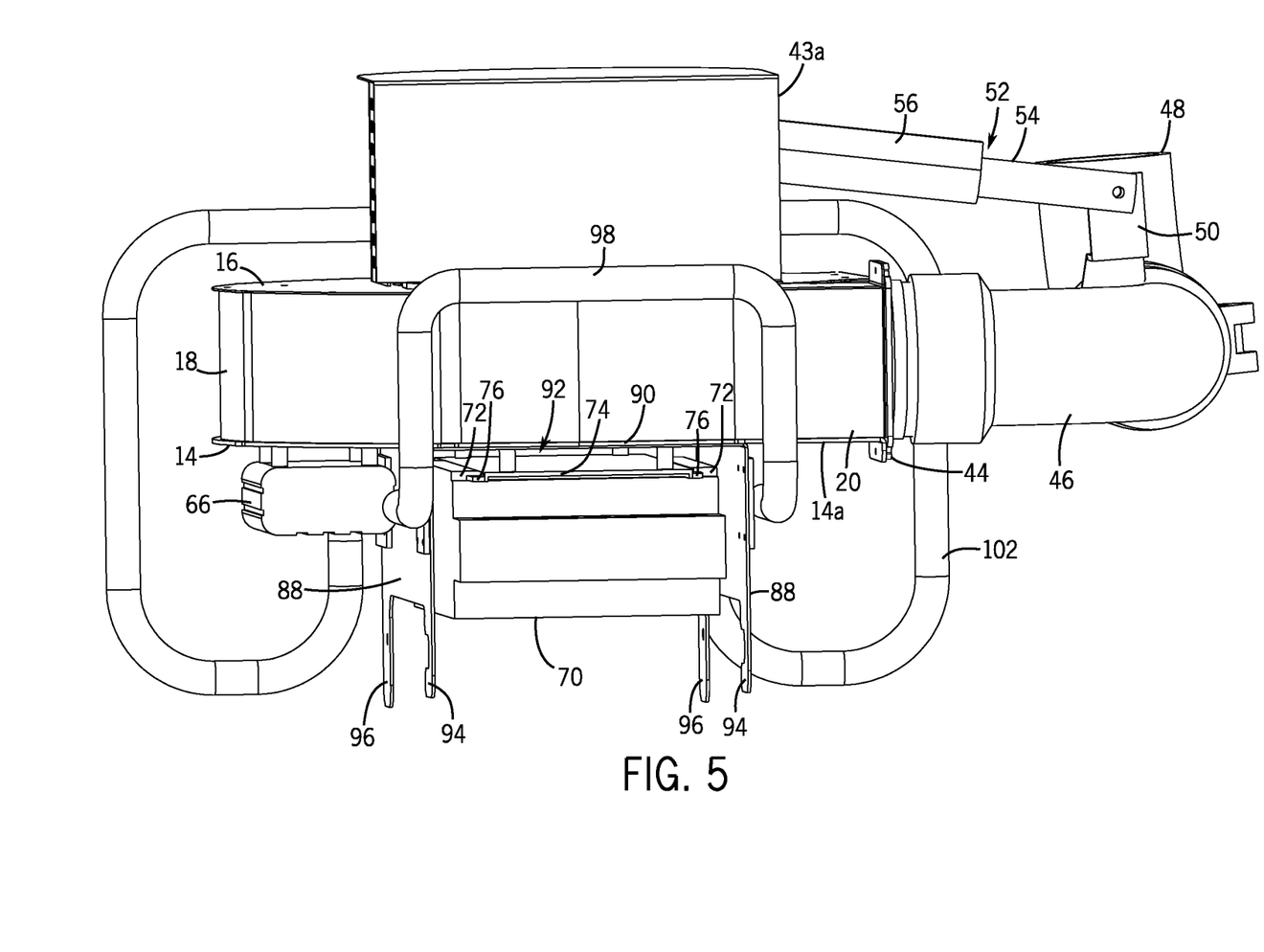
FIG. 5 is a top view of the battery-powered debris blower according to a preferred embodiment of the invention, showing mounting of the battery to the blower.
Figure 6:
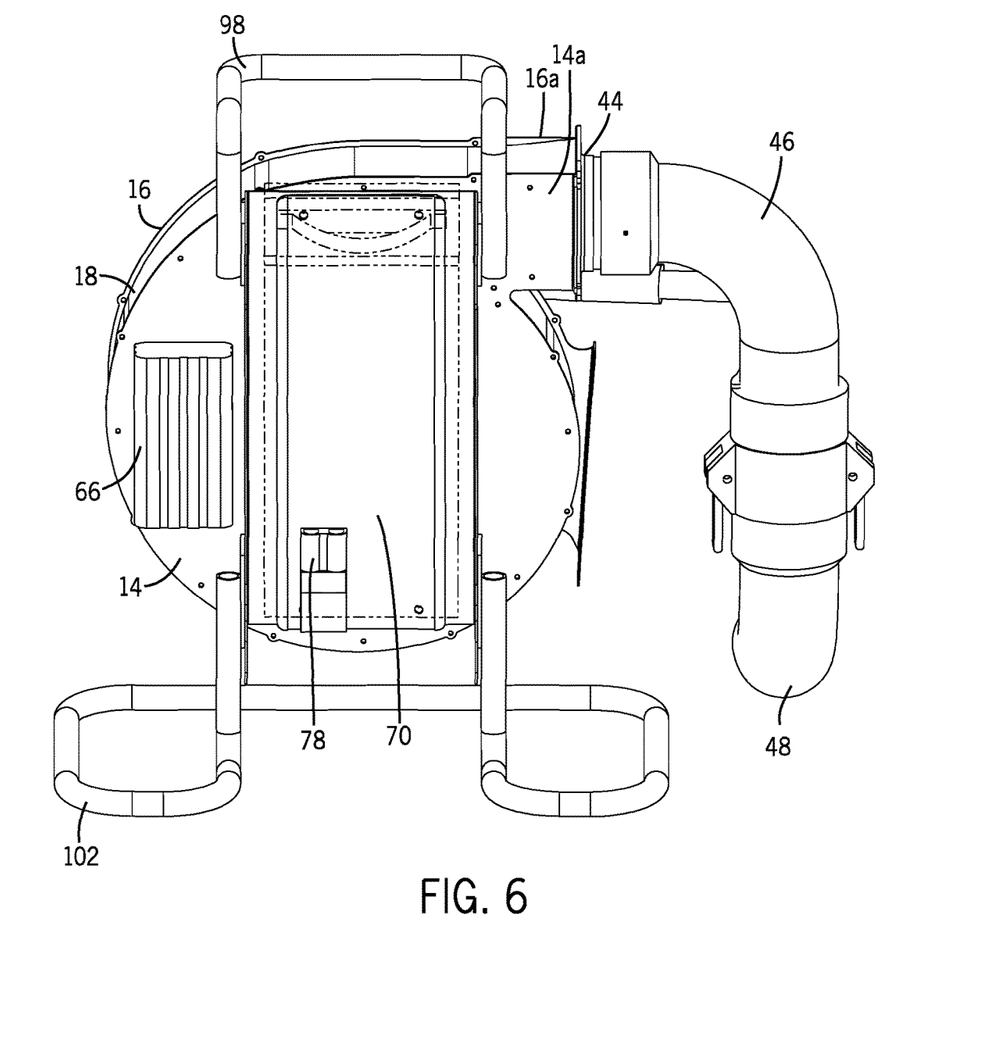
FIG. 6 is a rear view of the battery-powered debris blower according to a preferred embodiment of the invention, showing mounting of the battery to the blower, with the battery shown in phantom so that the battery connector can be seen.
Figure 7:
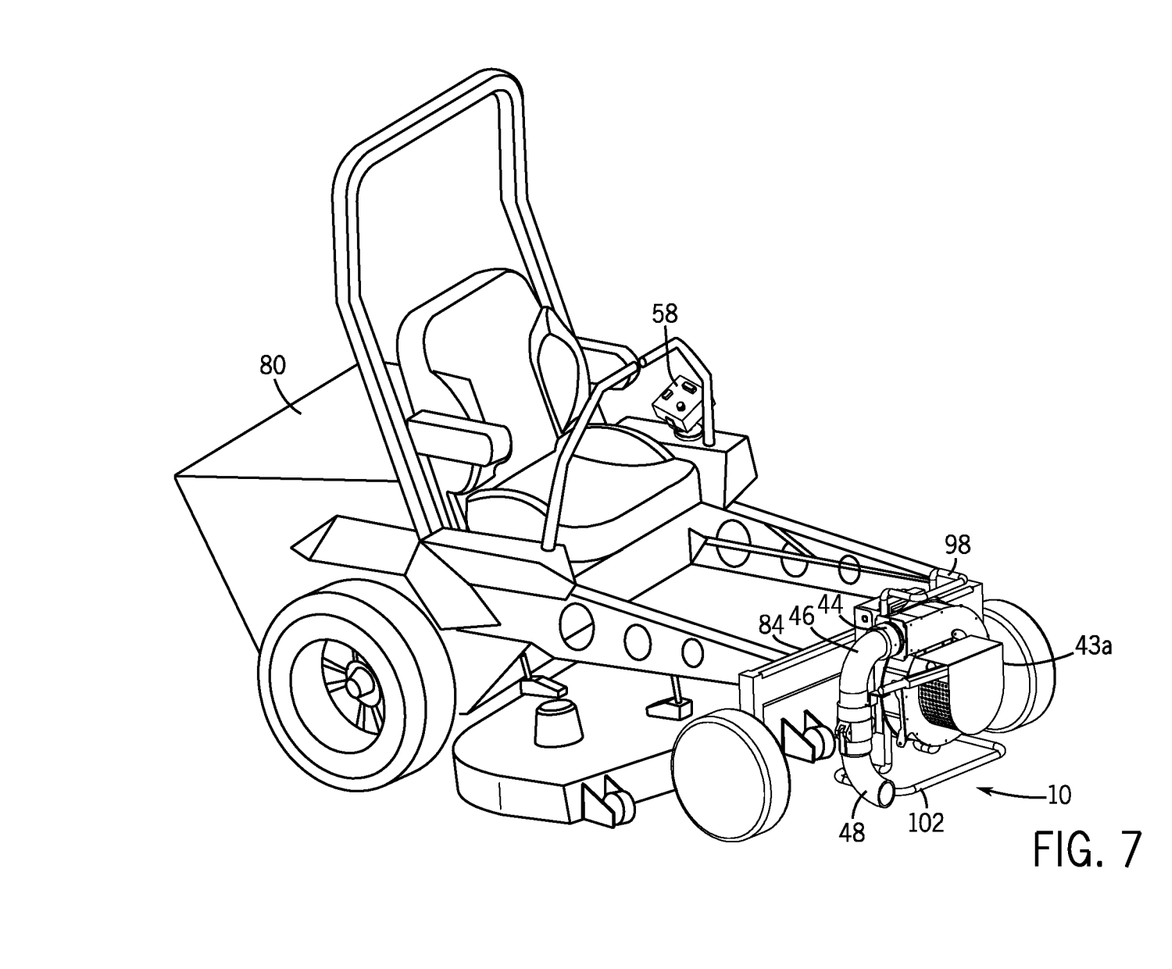
FIG. 7 is an isometric view of the battery-powered debris blower shown in FIG. 1 mounted to the front of a vehicle.
Figure 8:
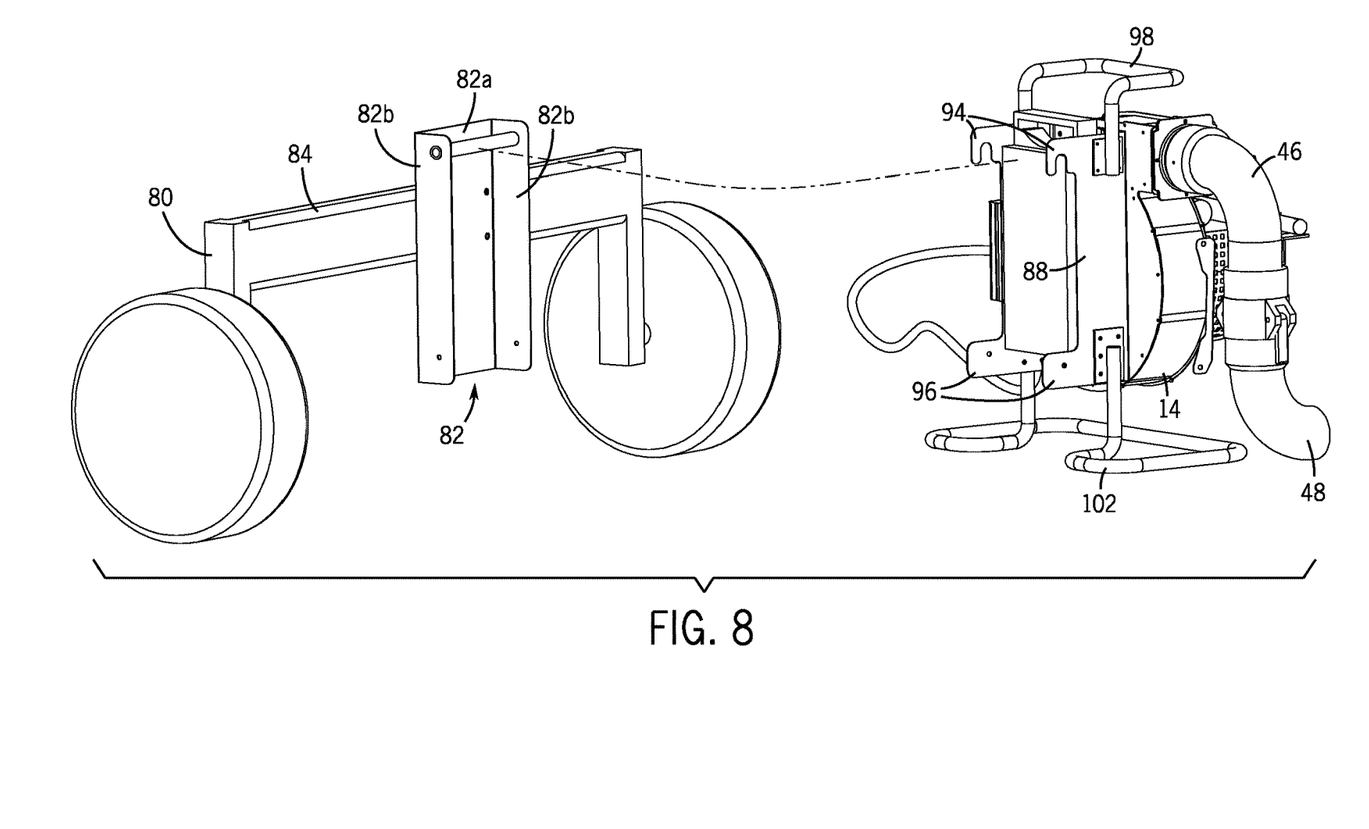
FIG. 8 is an exploded view, partially schematic, of the mounting of the battery-powered debris blower shown in FIG. 7.
Figure 9:
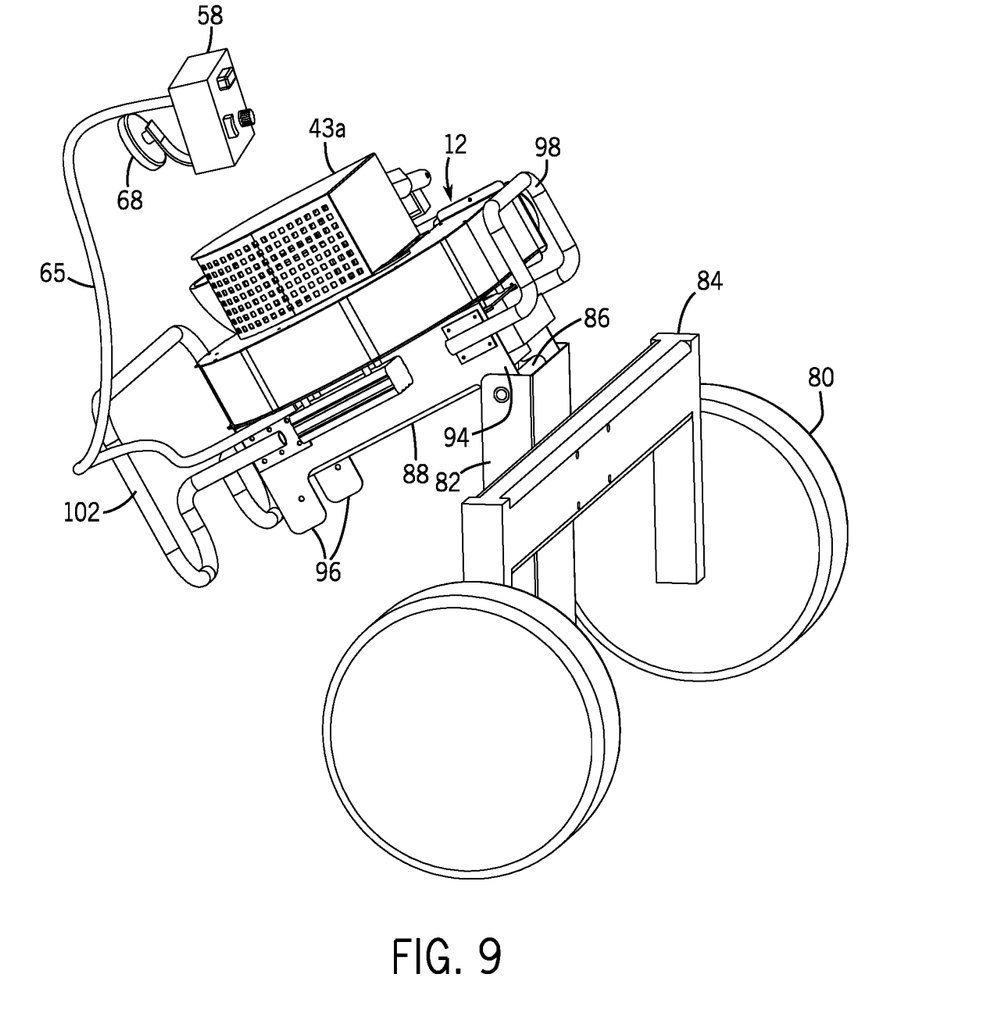
FIG. 9 is an isometric view, partially schematic, of the battery-powered debris blower shown in FIG. 1 partially mounted to the front of a vehicle.

According to the invention, the blower 10 may be easily and removably applied to a vehicle 80, such as a riding lawn mower. As shown in FIGS. 7, 8 and 9, a vehicle mounting plate 82 is affixed to the frame 84 of the vehicle 80. While the vehicle mounting plate may take various forms, the vehicle mounting plate 82 shown here is formed as a channel, with the plane of its center web 82a substantially parallel to the back plate 14 when mounted, and having side flanges 82b extending toward the blower 10. In the embodiment shown, the vehicle mounting plate 82 further includes a mount tube 86 extending between the side flanges 82b near the top of the vehicle mounting plate. The blower 10 is provided with a blower connector that engages with the vehicle mounting plate 82. Specifically, the blower 10 includes a pair of flanges 88 which extend outward from the blower toward the vehicle mounting plate 82. Flanges 88 may be joined by a center web 90 to form a unitary channel 92, as can be seen in FIG. 5, but such unitary nature is not required. Each flange 88 includes a hook portion 94 at the top. As shown in FIG. 9 where the blower is partially installed on the vehicle 80, these hook portions 94 engage with and rest upon mount tube 86. At its bottom, each flange 88 may include a flange extension 96, which extends outward from its respective flange, toward the vehicle mounting plate 82. Once the hook portions 94 contact the mount tube 86, blower 10 is pivoted downward until the flange extensions 96 contact the center web 82a of vehicle mounting plate 82, so as to provide stability and alignment of the blower 10 with the vehicle frame 84. Alternatively, there could be hook portions provided as part of the side flanges 82b of the vehicle mounting plate 82, although they would be upward facing hooks, rather than the downward facing hooks 94, and a mount tube similar to mount tube 86 could be provided between the flanges 88, so as to interact with the hooks of the side flanges 82b to connect the blower 10 with the vehicle 80.

To make the blower 10 easier to use, move, install and store, it may be provided with a handle. In the embodiment shown, a handle 98 is formed of a loop of tubing, connected at each end to the back plate 14 and extending above the blower 10. Alternative handles may be provided, each connected separately in some way to the blower, such as to the fan frame 12. Similarly, in order to make the blower 10 easier to store when not installed on a vehicle, it may be supplied with one or more stands. In the embodiment shown best in FIGS. 1, 2 6 and 8, a stand 102 is formed of a loop of tubing, each end of which is connected to the back plate 14, and extending downward below the blower, a majority of the lowest portion of the loop being relatively flat so as to provide stable support. Alternative forms of stand may also be provided, each connected separately in some way to the blower, such as to the fan frame 12.

Given the arrangement of the motor 34 and fan assembly 22, the blower 10 generally has a top speed of about 4700 rpm, compared to, as described above, 9,000-10,000 rpm for commercial gas debris blowers. Fan assembly 22 will deliver at least 500 CFM at 150 mph out of the outlet tube 48, with less than 60 db noise level at 50' distance. As stated above, a typical gas debris blower that delivers 500 cfm at 150 mph out of the tube causes about a 75-84 db noise level at 50' distance. Since noise doubles for every 6 db change, blower 10 is about 3-4 times quieter than a conventional gas debris blower. Most handheld battery-powered cordless blowers have a much lower capacity, moving about 400 cfm of air at a maximum of about 130 mph, and cause about 65-70 db of noise—still 2-3 times louder than blower 10, again with much less air movement performance. As described above, these hand held blowers also have a disadvantage in that their small battery will only run 9-12 minutes at top speed. Since it is mounted to a vehicle and therefore weight is less of an issue, with its large battery pack 70, blower 10 will run over 90 minutes at the best speed of the handheld blowers, or about 70 minutes at its top speed of 150 mph. Run time such as that is better than most commercial gas debris blowers using a full tank of gasoline.

While the apparatus hereinbefore described is effectively adapted to fulfill its intended objects, it is to be understood that the invention is not intended to be limited to the specific preferred embodiments set forth above. Rather, it is to be taken as including all reasonable equivalents to the subject matter described.

What is claimed is:

1. A debris blower, for mounting to a vehicle, comprising:
    a fan frame, having an air inlet of a certain area, and having an air outlet of a lesser area;
    a fan assembly positioned within the fan frame;
    a motor having a stator, and a motor shaft rotatable with respect to the stator, the stator connected to the fan frame and the shaft connected to the fan assembly so as to rotate the fan assembly within the fan frame, and thus move air from the air inlet to the air outlet;
    a battery pack;
    a controller connected to the motor and to the battery pack, for applying power from the battery pack to energize the motor and thus rotate the fan to move air from the air inlet to the air outlet;
    a vehicle mounting plate adapted to be connected to the vehicle; and
    a blower mounting plate connected to the fan frame, and capable of engaging with the vehicle mounting plate so as to connect the blower to the vehicle.

2. A debris blower as recited in claim 1 wherein the fan frame has a back plate and a motor plate, the motor plate having an opening of a certain area which functions as the air inlet, the back plate and motor plate being connected to and separated by a side wall, and both being generally ring shaped, except for the area of the air outlet.

3. A debris blower as recited in claim 1 wherein the fan assembly has a back ring and a front ring, and vanes separating the front ring from the back ring by a predetermined spacing.

4. A debris blower as recited in claim 3 wherein the back ring has a center, and wherein each vane is angled or curved with respect to the center of the back ring.

5. A debris blower as recited in claim 4 wherein the angle or curve of all the vanes with respect to the center of the back ring is the same.

6. A debris blower as recited in claim 1, further comprising a handle and a stand connected to the fan frame.

7. A debris blower as recited in claim 1 further comprising a blower tube removably attached to the outlet, an outlet tube rotatably attached to the blower tube, and a directional controller for controlling the direction of the outlet tube.

8. A debris blower as recited in claim 7 wherein the directional controller includes an actuator connected between the fan frame and the outlet tube.

9. A debris blower as recited in claim 8 further comprising a tube control lever connected to the outlet tube, and wherein the actuator includes a moving part connected to the control lever and a stationary part connected to the fan frame.

10. A debris blower, comprising:
   a fan frame, having a back plate and a motor plate, the motor plate having an opening of a certain area which functions as an air inlet, the back plate and motor plate being connected to and separated by a side wall, and both being generally ring shaped, except having an air outlet area;
   a fan assembly positioned within the fan frame, the fan assembly having a back ring and a front ring, and spaced apart from each other by a plurality of vanes, each vane angled and curved the same as all the other vanes with respect to the center of the back ring;
   a motor having a stator, and a motor shaft rotatable with respect to the stator, the stator connected to the fan frame, and the shaft connected to the fan assembly, so as to rotate the fan assembly within the fan frame, and thus move air from the air inlet to the air outlet;
   a removable battery pack having electrical connectors;
   electrical connectors mounted to the fan frame and capable of mating to the electrical connectors of the removable battery pack;
   a controller electrically connected to the motor and to the battery pack, for using power from the battery pack to energize the motor and thus rotate the fan to move air from the air inlet to the air outlet; and
   a vehicle mounting plate adapted to be connected to a vehicle; and
   a blower mounting plate connected to the fan frame, and capable of engaging with the vehicle mounting plate so as to connect the blower to the vehicle.

11. A debris blower as recited in claim 10, further comprising a mounting tube connected to the vehicle mounting plate, and wherein the blower mounting plate includes at least one hook for connecting with the mounting tube.

12. A debris blower as recited in claim 11 wherein the vehicle mounting plate further comprises flanges, and wherein the blower mounting plate includes flange extensions to contact the vehicle mounting plate.

13. A debris blower as recited in claim 10, further comprising a handle and a stand connected to the fan frame.

14. A debris blower as recited in claim 10 further comprising a blower tube removably attached to the outlet, an outlet tube rotatably attached to the blower tube, and a directional controller for controlling the direction of the outlet tube.

15. A debris blower as recited in claim 14 wherein the directional controller includes an actuator connected between the fan frame and the outlet tube.

16. A debris blower as recited in claim 15 further comprising a tube control lever connected to the outlet tube, and wherein the actuator includes a moving part connected to the control lever and a stationary part connected to the fan frame.

17. A debris blower, comprising:
   a fan frame, having an air inlet of a certain area, and having an air outlet of a lesser area;
   a fan assembly positioned within the fan frame;
   a motor having a rotatable motor shaft connected to the fan assembly so as to rotate the fan assembly with respect to the fan frame, and thus move air from the air inlet to the air outlet;
   a battery pack;
   a controller connected to the motor and to the battery pack, for applying power from the battery pack to energize the motor and thus rotate the fan to move air from the air inlet to the air outlet; and
   a mounting device connected to the fan frame and adapted to be connected to a vehicle so as to connect the blower to the vehicle.

18. A debris blower as recited in claim 17 wherein the fan frame has a back plate and a motor plate, the motor plate having an opening of a certain area which functions as the air inlet, the back plate and motor plate being connected to and separated by a side wall, and both being generally ring shaped, except for the area of the air outlet.

19. A debris blower as recited in claim 17 wherein the fan assembly has a back ring and a front ring, and vanes separating the front ring from the back ring by a predetermined spacing.

20. A debris blower as recited in claim 17 further comprising:
   an outlet tube removably and rotatably attached to the air outlet, and a directional controller for controlling the direction of the outlet tube, the directional controller including an actuator connected between the fan frame and the outlet tube; and
   a tube control lever connected to the outlet tube, wherein the actuator includes a movable part connected to the control lever and a stationary part connected to the fan frame.

* * * * *